United States Patent [19]

Ealer

[11] Patent Number: 5,149,484
[45] Date of Patent: Sep. 22, 1992

[54] PROCESS FOR INJECTION MOLDING

[75] Inventor: George E. Ealer, Whitehouse Station, N.J.

[73] Assignee: Union Carbide Chemicals & Plastics Technology Corporation, Danbury, Conn.

[21] Appl. No.: 625,467

[22] Filed: Dec. 11, 1990

[51] Int. Cl.$^5$ .............................................. B29C 45/00
[52] U.S. Cl. ................... 264/328.17; 264/331.17; 524/108
[58] Field of Search ........... 264/328.1, 328.17, 328.18, 264/330, 331.11, 331.17; 524/108

[56] References Cited

U.S. PATENT DOCUMENTS

| | | | |
|---|---|---|---|
| 4,000,229 | 12/1976 | Wainer | 264/328.18 |
| 4,294,794 | 10/1981 | Lovell et al. | 264/328.1 |
| 4,386,188 | 5/1983 | Grancio et al. | 264/328.17 |
| 4,585,817 | 4/1986 | Su et al. | 524/108 |
| 5,082,902 | 1/1992 | Gurevitch et al. | 264/328.17 |

FOREIGN PATENT DOCUMENTS

| | | | |
|---|---|---|---|
| 143362 | 11/1979 | Japan . | |
| 8346 | 1/1985 | Japan . | |
| 161442 | 8/1985 | Japan . | |
| 60-215048 | 10/1985 | Japan | 524/108 |
| 61-095050 | 5/1986 | Japan | 524/108 |
| 255952 | 11/1986 | Japan . | |

*Primary Examiner*—Jan H. Silbaugh
*Assistant Examiner*—Brian J. Eastley
*Attorney, Agent, or Firm*—Saul R. Bresch

[57] ABSTRACT

A process for preparing a low haze molded article includes adding a nucleating agent to a polypropylene homopolymer or copolymer to form prenucleated polypropylene having a molecular weight of at least about 20,000 and an isotactic index of at least about 60 percent, and forming a molding composition by mixing the prenucleated polypropylene with linear low density polyethylene having a melt index of at least about 120 grams per 10 minutes, in an amount of about 1 to 5 percent by weight based on the total weight of the polyethylene and the polypropylene. This mixture is then introduced into an injection molding zone where it is molded at a temperature below the melting point of the polypropylene.

6 Claims, No Drawings

PROCESS FOR INJECTION MOLDING

TECHNICAL FIELD

This invention relates to an improved process for the injection molding of polyethylene.

BACKGROUND INFORMATION

Articles injection molded from polyethylene whether from high pressure low density polyethylene, medium density polyethylene, or linear low density polyethylene, tend to be hazy or cloudy rather than substantially transparent, a desirable property in many polyethylene applications.

DISCLOSURE OF THE INVENTION

An object of this invention, therefore, is to provide a process for injection molding, which provides a molded article having reduced haze.

Other objects and advantages will become apparent hereafter.

According to the present invention, the above object is met by a process comprising (i) introducing into an injection molding zone, under molding conditions, a composition comprising:

(a) linear low density polyethylene having a melt index of at least about 100 grams per minute; and (b) a polypropylene homopolymer or copolymer having a molecular weight of at least about 20,000 and an isotacticity of at least about 60 percent in an amount of about 1 to about 10 percent by weight based on the total weight of the polyethylene and the polypropylene; and (ii) molding said composition at a temperature below the melting point of the polypropylene.

DESCRIPTION OF THE PREFERRED EMBODIMENTS(S)

Linear low density polyethylene is a copolymer of ethylene and one or more alpha-olefins and, optionally, one or more non-conjugated dienes, and can be prepared in accordance with the disclosure of U.S. Pat. No. 4,101,445. The alpha-olefins can have 3 to 12 carbon atoms and preferably have 3 to 8 carbon atoms. They are exemplified by propylene, 1-butene, 1-hexene, 4-methyl-1-pentene, and 1-octene. The dienes are exemplified by butadiene, 1,4-hexadiene, ethylidene norbornene, dicyclopentadiene and vinylnorbornene.

The linear low density polyethylene used in the process of this invention has a melt index of at least about 100 grams per 10 minutes and preferably has a melt index in the range of about 120 to about 200 grams per 10 minutes. The melt index is determined in accordance with ASTM D-1238, Condition E, and measured at 190° C.

The density of the linear low density polyethylene can be in the range of about 0.900 to about 0.960 gram per cubic centimeter and is preferably in the range of about 0.920 to about 0.935 gram per cubic centimeter.

The polypropylene can be prepared by a process such as the one described in U.S. Pat. No. 4,304,891. A preferred polypropylene is a isotactic polypropylene homopolymer, but copolymers based on a major proportion of propylene, preferably at least about 65 percent by weight, can also be used. In the case of the copolymer, the comonomers other than propylene can be alpha-olefins having 2 or 4 to 12 carbon atoms and, optionally, dienes. Examples of suitable alpha-olefins and dienes are mentioned above with respect to polyethylene, but it must be remembered that ethylene is one of the most desirable comonomers. It should be noted that 1-butene is not a preferred comonomer; however, prenucleated polypropylene is a preferred form.

The term "prenucleated" means that a nucleating agent is added to the polypropylene before the polypropylene is introduced into the injection molding zone. Nucleating agents allow the polymer to be crystallized at a higher temperature during injection molding and blow molding operations. Examples of nucleating agents are aromatic carboxylic acids and their metal salts such as sodium benzoate, aluminum p-tert-butyl benzoate, and aluminum benzoate; metal organophosphates such as di(4-tert-butylphenyl) phosphate; benzylidene sorbitol compounds; talc; polyvinyl cyclohexane; and organic dicarboxylic acids such as sebacic acid.

The polypropylene should have an isotactic index of at least about 60 percent and preferably has an isotactic index in the range of about 90 to about 98 percent. The polypropylene should also have a molecular weight of at least about 20,000 and Preferably has a molecular weight in the range of about 100,000 to about 200,000.

The polypropylene, generally, has a melting point in the range of about 145° to about 165° C. The melting point is preferably in the range of about 155 to about 165° C., however. The most preferred polypropylene is that with the highest melting point.

The polypropylene is introduced into the injection molding zone in an amount of about 1 to about 10 percent by weight based on the total weight of the linear low density polyethylene/polypropylene blend and is preferably used in an amount of about 1 to about 5 percent by weight.

A description of typical injection molding apparatus can be found in the Injection Molding Handbook, edited by Rosato et al, Van Nostrand, New York, 1986, pages 10 and 11, and Injection Molding, Rubin, John Wiley & Sons, New York, 1972, pages 5 and 6. Typical conditions are described in U.S. Pat. No. 4,390,677.

The injection molding apparatus is operated at an internal temperature below the melting point of the polypropylene. It is preferably operated at a temperature in the range of about 135° to about 165° C. provided that the particular temperature used is below the melting point of the selected polypropylene.

Conventional additives can be added to the mixture of linear low density polyethylene and polypropylene either before the mixture is introduced into the injection molding zone, with the introduction of the mixture into the injection molding zone, or during processing. The amount of additive is usually in the range of about 0.01 to about 50 percent by weight based on the weight of the resin mixture. Useful additives are antioxidants, ultraviolet absorbers, antistatic agents, pigments, dyes, fillers, slip agents, fire retardants, plasticizers, processing aids, lubricants, stabilizers, and smoke inhibitors.

The advantages of this invention are that the article molded has reasonable strength together with low haze.

The patents mentioned in this specification are incorporated by reference herein.

EXAMPLES 1 AND 2

A concentrate is prepared by melt compounding the following components in a 2½ inch single screw compounding machine at a temperature of 171° C.:

| Component | Percent by Weight |
|---|---|
| linear low density polyethylene (copolymer of ethylene and 1-hexene: 92.6% by wt. ethylene: melt index = 135; density = 0.932 g/cc) | 90 |
| polypropylene (homopolymer) crystallinity = ~ 55% by wt. melt flow = 3000; melting point = 158° C.; molecular weight = 23,000; isotactic index = 95%) | 10 |

The concentrate is let down into the linear low density polyethylene described above in the following proportions:

| Component | Percent by Weight |
|---|---|
| linear low density polyethylene | 50 |
| concentrate | 50 |

The percent by weight of polypropylene is 5 percent based on the total weight of the blend. The let down conditions are the same as for the preparation of the concentrate.

The blend is divided into two portions and each is injection molded into a dishpan. The injection molding apparatus is similar to the one described above.

The constant conditions are as follows:
1. pressure to fill
2. screw back pressure
3. screw rpm
4. screw setting
5. injection pressure
6. molding time
7. shot size
8. equipment hardware Crystallinity is the weight of crystalline polypropylene based on the total weight of the polypropylene. The value is determined using a du Pont Differential Scanning Calorimeter, and is given in weight percent.

Melt flow is determined under ASTM 1238, Condition L, at 230° C. and 2.16 kilogram load. The results are given in grams per 10 minutes.

Isotactic index is defined as the insoluble fraction when the polypropylene is extracted with boiling heptane. It is expressed as percent by weight.

The variable conditions and results are set forth in the following Table.

TABLE

| Ex- ample | Cylinder Temp (°C.) | Melt Temp (°C.) | Nozzle Adapt (°C.) | Mold Temp (°C.) | Haze Units per mil |
|---|---|---|---|---|---|
| 1 | 124/129/121/179 | 150 | 54/13 | 55/48 | 1.28 |
| 2 | 132/182/191/193 | 211 | 54/10 | 55/48 | 1.43 |

Notes to Table:
1. Cylinder Temperature (°C.): (The four cylinder temperatures are, respectively, the temperatures for the four heating zones on the barrel. They are changed in example 2 to get the melt temperature above the melting point of the polypropylene.)
2. Melt Temperature (°C.) is the temperature at which the injection molding takes place.
3. Nozzle Adapt (°C.): (The first temperature is nozzle temperature and the second temperature is adaptor temperature.)
4. Mold Temperature (°C.): (The two mold halves have different temperatures to aid in part removal.)
5. Haze Units/mil is determined under ASTM 1003. The units are devised to normalize the small differences, which can occur when comparing samples. Haze is the percentage of transmitted light, which deviates more than 2.5 degrees from the direction of an incident beam. The calculations for examples 1 and 2 follow. The molded dishpan is 77 mils thick in Example 1 and 71 mils thick in example 2. The total haze in example 1 is 98.6 and in example 2 is 101.7.

Example 1
$$\frac{98.6}{77} = 1.28 \text{ haze units per mil}$$

Example 2
$$\frac{101.7}{71} = 1.43 \text{ haze units per mil}$$

I claim:

1. A process for preparing a low haze molded article comprising:
   (i) adding a nucleating agent to a polypropylene homopolymer or copolymer to provide a prenucleated polypropylene homopolymer or copolymer having a molecular weight of at least about 20,000 and an isotactic index of at least about 60 percent;
   (ii) forming a composition by mixing the prenucleated polypropylene with linear low density polyethylene having a melt index of at least about 120 grams per 10 minutes, in an amount of about 1 to about 5 percent by weight based on the total weight of the polyethylene and the polypropylene;
   (iii) introducing into an injection molding zone, under molding conditions, said composition; and
   (iv) molding said composition at a temperature below the melting point of the polypropylene.

2. The process defined in claim 1 wherein the linear low density poylyethlene has a melt index in the range of about 120 to about 200 grams per 10 minutes.

3. The process defined in claim 1 wherein the polyethylene has a density in the range of about 0.900 to about 0.960 gram per cubic centimeter.

4. The process defined in claim 1 wherein the polypropylene has a molecular weight in the range of about 20,000 to about 200,000.

5. The process defined in claim 1 wherein the polypropylene has an isotactic index in the range of about 60 to about 98 percent.

6. The process defined in claim 1 wherein the molding temperature is in the range of about 135° to about 165° C.

* * * * *